United States Patent
Zhou et al.

(10) Patent No.: US 11,183,059 B2
(45) Date of Patent: Nov. 23, 2021

(54) PARKING MANAGEMENT ARCHITECTURE FOR PARKING AUTONOMOUS DRIVING VEHICLES

(71) Applicant: Baidu USA LLC, Sunnyvale, CA (US)

(72) Inventors: Jinyun Zhou, Sunnyvale, CA (US); Runxin He, Sunnyvale, CA (US); Qi Luo, Sunnyvale, CA (US); Jinghao Miao, Sunnyvale, CA (US); Jiangtao Hu, Sunnyvale, CA (US); Yu Wang, Sunnyvale, CA (US); Jiaxuan Xu, Sunnyvale, CA (US); Shu Jiang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 302 days.

(21) Appl. No.: 16/391,232

(22) Filed: Apr. 22, 2019

(65) Prior Publication Data

US 2020/0334985 A1 Oct. 22, 2020

(51) Int. Cl.
G08G 1/14 (2006.01)
G06F 16/29 (2019.01)
G05D 1/02 (2020.01)
G05D 1/00 (2006.01)

(52) U.S. Cl.
CPC ............ *G08G 1/14* (2013.01); *G05D 1/0088* (2013.01); *G05D 1/0231* (2013.01); *G05D 1/0276* (2013.01); *G06F 16/29* (2019.01); *G05D 2201/0213* (2013.01)

(58) Field of Classification Search
CPC .................. G08G 1/14; G06F 16/29; G05D 1/0088–0276; G05D 2201/0213
See application file for complete search history.

(56) References Cited

U.S. PATENT DOCUMENTS

| 7,783,530 | B2* | 8/2010 | Slemmer | G06Q 10/02 |
| | | | | 705/28 |
| 8,816,880 | B1* | 8/2014 | Foster | G08G 1/146 |
| | | | | 340/932.2 |
| 9,087,453 | B2* | 7/2015 | Krivacic | G08G 1/14 |
| 9,594,956 | B2* | 3/2017 | Cohen | G07B 15/02 |
| 9,666,073 | B1* | 5/2017 | Lin | G06Q 10/06 |
| 9,711,047 | B1* | 7/2017 | Knas | G08G 1/143 |
| 9,818,300 | B1* | 11/2017 | Nnaji | G08G 1/142 |
| 10,563,998 | B1* | 2/2020 | Rivera | G01C 21/3614 |
| 2012/0265434 | A1* | 10/2012 | Woodard | G08G 1/147 |
| | | | | 701/423 |

(Continued)

*Primary Examiner* — Calvin Cheung
(74) *Attorney, Agent, or Firm* — Womble Bond Dickinson (US) LLP (57) ABSTRACT

According to one embodiment, in response to a request to park an ADV into a parking lot, a remote server is accessed over a network (e.g., a VX2 link) to obtain a list of parking spaces that appear to be available in the parking lot. Based on the list of available parking spaces and the map associated with the parking lot, a route is generated to navigate through at least the available parking spaces. The ADV is driven according to the route to locate at least one of the available parking spaces and to park the ADV into the located available parking space. The centralized server is configured to periodically receive signals from a number of parking lots indicating which of the parking spaces of the parking lots are apparently available.

20 Claims, 9 Drawing Sheets

(56) References Cited

U.S. PATENT DOCUMENTS

| | | | | |
|---|---|---|---|---|
| 2013/0060421 | A1* | 3/2013 | Kadowaki | B60R 1/00 |
| | | | | 701/36 |
| 2015/0066545 | A1* | 3/2015 | Kotecha | G08G 1/148 |
| | | | | 705/5 |
| 2016/0247327 | A1* | 8/2016 | Kozawa | G06Q 10/06 |
| 2016/0371607 | A1* | 12/2016 | Rosen | G01C 21/3667 |
| 2017/0025009 | A1* | 1/2017 | Hakeem | G08G 1/144 |
| 2017/0132482 | A1* | 5/2017 | Kim | B60K 35/00 |
| 2017/0144654 | A1* | 5/2017 | Sham | G05D 1/0088 |
| 2017/0313353 | A1* | 11/2017 | Huang | G01C 21/3407 |
| 2017/0323227 | A1* | 11/2017 | Sadeghi | G06Q 20/102 |
| 2017/0329346 | A1* | 11/2017 | Latotzki | G05D 1/0088 |
| 2017/0345302 | A1* | 11/2017 | Esteban | G08G 1/142 |
| 2018/0130351 | A1* | 5/2018 | Ha | G06T 11/60 |
| 2018/0315309 | A1* | 11/2018 | Becker | H04L 9/0643 |
| 2018/0345955 | A1* | 12/2018 | Kim | B60W 30/06 |
| 2018/0373249 | A1* | 12/2018 | Choi | G05D 1/0088 |
| 2019/0031038 | A1* | 1/2019 | Pursifull | B60L 53/65 |
| 2019/0392543 | A1* | 12/2019 | Bautista | G06Q 50/30 |
| 2020/0086853 | A1* | 3/2020 | Kumar | G05D 1/0088 |
| 2020/0117926 | A1* | 4/2020 | Kim | G08G 1/145 |
| 2020/0130676 | A1* | 4/2020 | Smid | G05D 1/0278 |
| 2020/0143683 | A1* | 5/2020 | Maruiwa | G08G 1/143 |
| 2020/0160712 | A1* | 5/2020 | Beaurepaire | G08G 1/143 |
| 2020/0193824 | A1* | 6/2020 | Lee | G08G 1/144 |
| 2020/0211400 | A1* | 7/2020 | Cho | G08G 1/202 |
| 2020/0242933 | A1* | 7/2020 | Brudner | G08G 1/146 |
| 2020/0258386 | A1* | 8/2020 | Lu | G08G 1/143 |
| 2020/0307554 | A1* | 10/2020 | Lai | B60W 30/06 |
| 2021/0019671 | A1* | 1/2021 | Cao | G06Q 30/0284 |

\* cited by examiner

PARKING MANAGEMENT ARCHITECTURE FOR PARKING AUTONOMOUS DRIVING VEHICLES

TECHNICAL FIELD

Embodiments of the present disclosure relate generally to operating autonomous vehicles. More particularly, embodiments of the disclosure relate to parking system architecture for parking autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Autonomous driving has been defined in several levels. In level four (L4) autonomous driving, vehicles are designed to perform all safety-critical driving functions and monitor roadway conditions for an entire trip. Motion planning and control are critical operations in autonomous driving, particularly for autonomous parking situations.

Vehicle parking is a vital part of autonomous driving scenarios. How to efficiently and safely manage parking for L4 autonomous driving is an important topic to explore. There has been a lack of efficient ways for L4 autonomous parking.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a parking management architecture or system is provided to centrally manage the parking spaces (also referred to as parking spots or parking areas) of various parking lots (also referred to as a parking structure) using high-definition (HD) maps. In such a configuration, each of the participating parking lots managed by a central system is equipped with one or more sensors that are configured to sense and detect which of the parking spaces of the parking lot are available. The signals representing the available parking spaces may be periodically transmitted to a centralized server over a network. The centralized server compiles a list of parking spaces that appear to be available at different points in time, which may be maintained in a database and accessible via an application programming interface (API) over a network. The centralized server may be communicatively coupled to multiple parking lots to manage the parking spaces thereof.

When an autonomous driving vehicle (ADV) decides to park in a particular parking lot, the ADV accesses the centralized server over a network, such as, for example, via a vehicle-to-everything (V2X) link to obtain a list of parking spaces within the parking lot that appear to be available at the point in time. Based on the list of apparent available parking spaces, the ADV generates a route to navigate through the available parking spaces within the parking lot, for example, one by one sequentially. When the ADV reaches an available parking space indicated in the list, the ADV may perform a perception process to verify whether the parking space is indeed available based on sensor data obtained from one or more sensors mounted on the vehicle. If so, the ADV plans a parking path to park the ADV into the parking space using a set of one or more parking rules.

According to one embodiment, in response to a request to park an ADV into a parking lot, a remote server is accessed over a network (e.g., a VX2 link) to obtain a list of parking spaces that appear to be available in the parking lot. Based on the list of available parking spaces and the map associated with the parking lot, a route is generated to navigate through at least the available parking spaces within the parking lot. The ADV is driven according to the route to locate at least one of the available parking spaces and to park the ADV into the located available parking space. The centralized server is configured to periodically receive signals from a number of parking lots indicating which of the parking spaces of the parking lots are apparently available.

In one embodiment, the route may be designed to navigate through all of the apparently available parking spaces in the shortest distance. When an apparently available parking space is located, the ADV verifies whether the parking space is indeed available based on the perception process, which is performed based on sensor data obtained from various sensors mounted on the vehicle. If the parking space is unavailable in response to the verification, the ADV continues to drive according to the route to locate a next parking space indicated in the list, until a parking space is located and verified or all of the parking spaces in the list have been processed.

According to another embodiment, if there is no available parking spaces indicated in the list or the list cannot be obtained from the centralized server due to network issues, the ADV may still drive through all of the parking spaces in the parking lot to locate a possible available parking space using a perception process based on sensor data obtained from one or more sensors of the ADV. Alternatively, both a method relied on perception and a method using centralized server method may be utilized in parallel to find the first parking space available in the parking lot.

Figure 1:
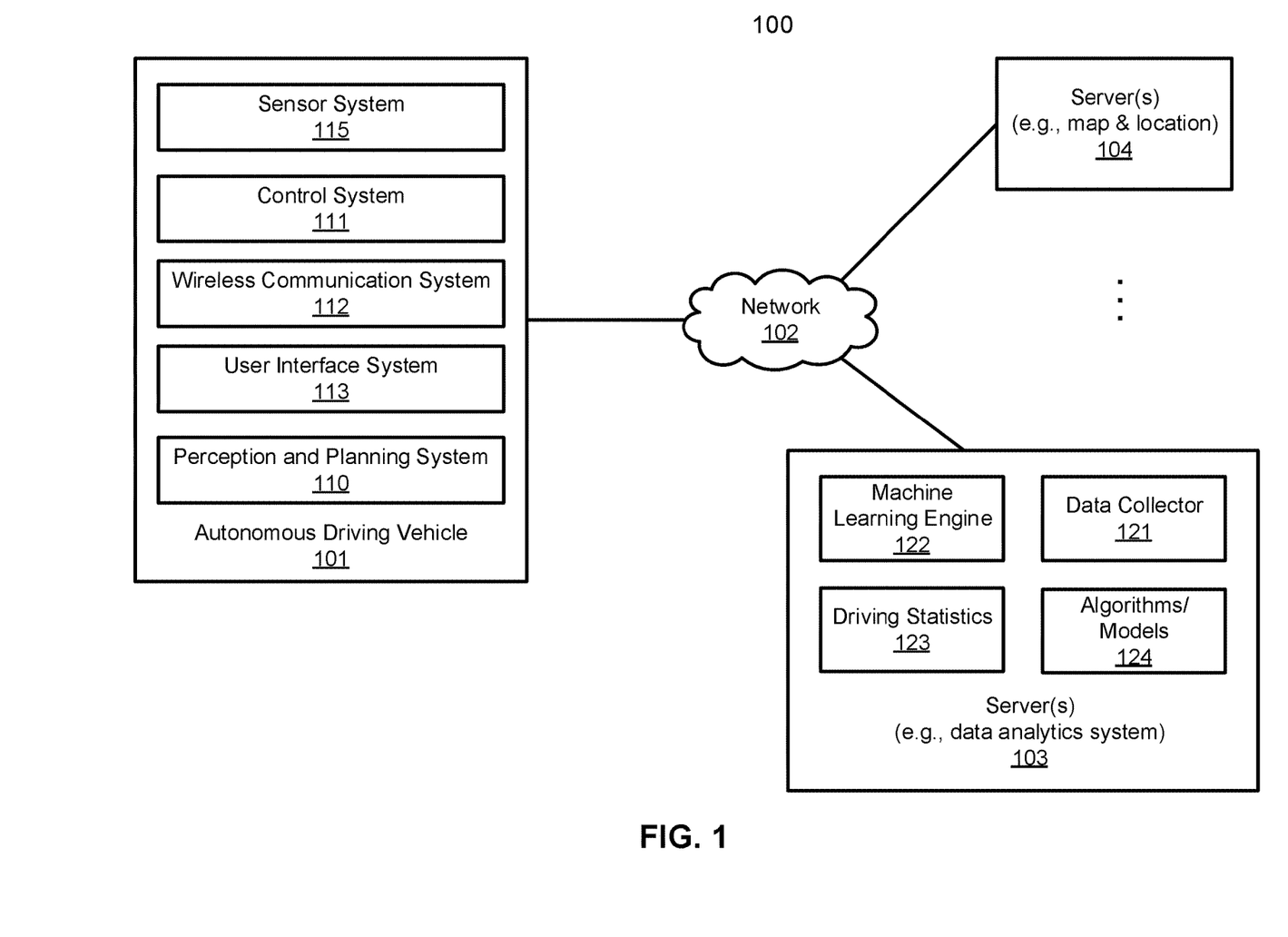
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
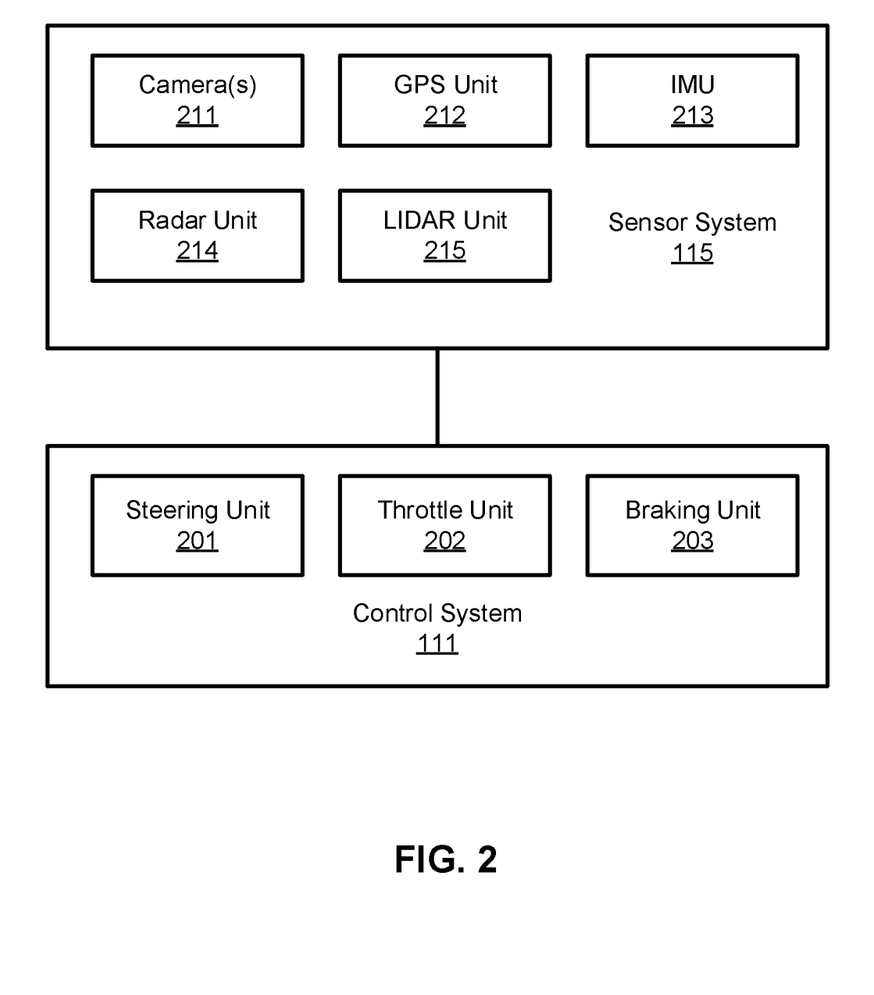
FIG. 2 is a block diagram illustrating an example of an autonomous vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include parking rules to search and park an ADV into a parking space of a parking lot and communication rules with a centralized server that manages a number of parking lots to obtain a list of available parking spaces of a parking lot. Algorithms 124 can then be uploaded on ADVs to be utilized during autonomous driving in real-time.

Figure 3A:
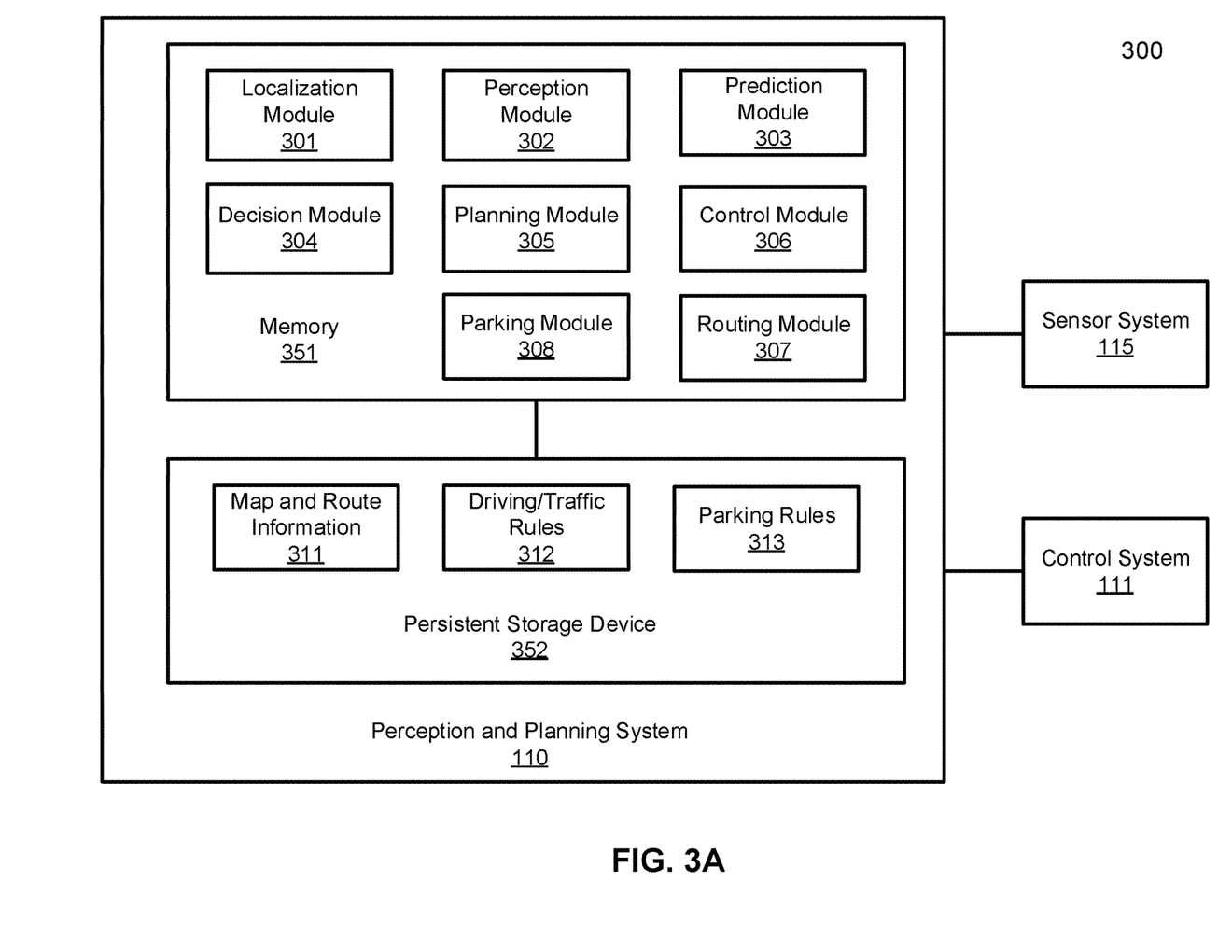
FIGS. 3A-3B are block diagrams illustrating an example of a perception and planning system used with an autonomous vehicle according to one embodiment.
Figure 3B:
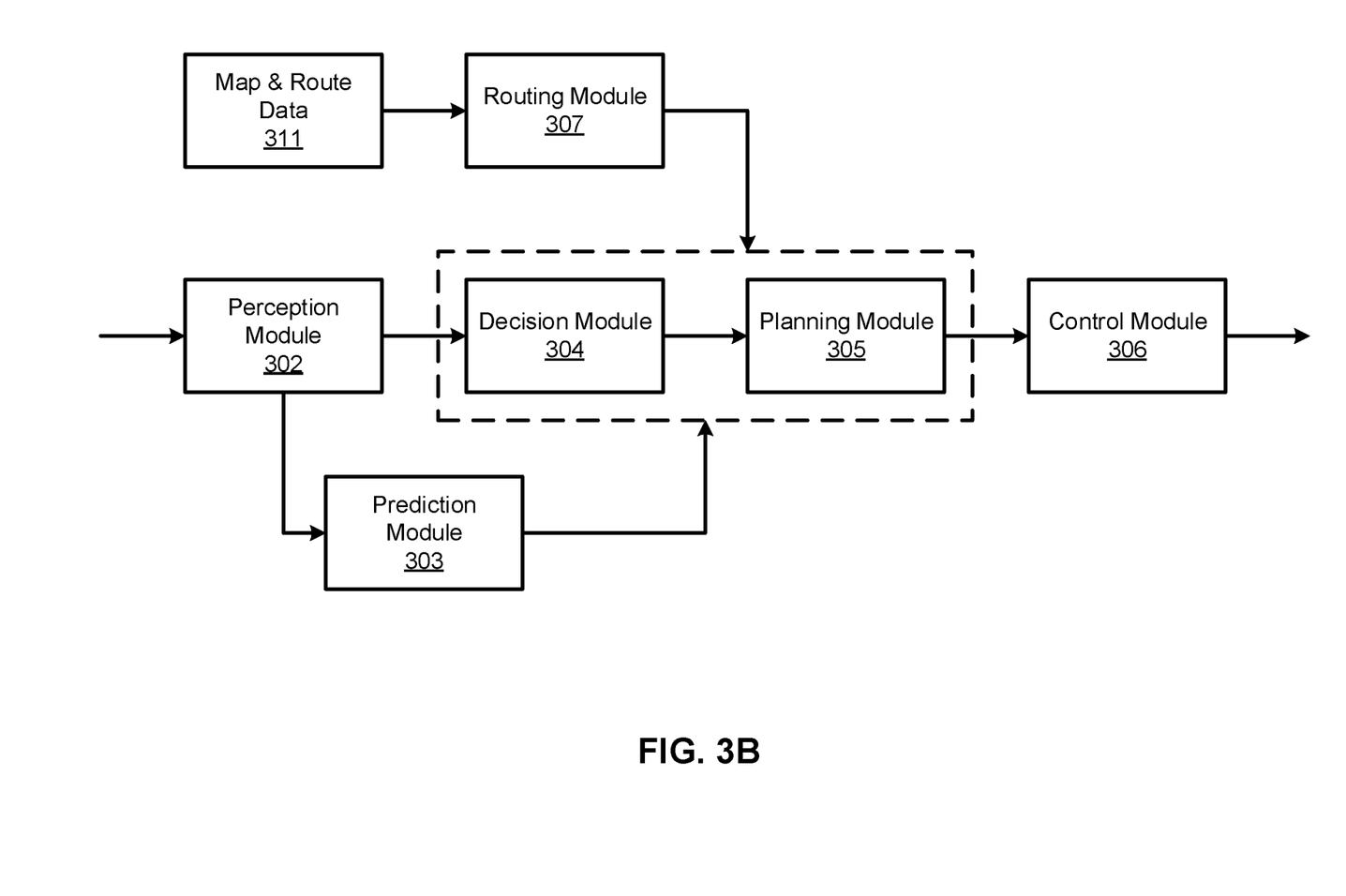

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and parking module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, the functionalities of parking module 308 may be implemented in at least some of perception module 302, planning module 305, and routing module 307.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
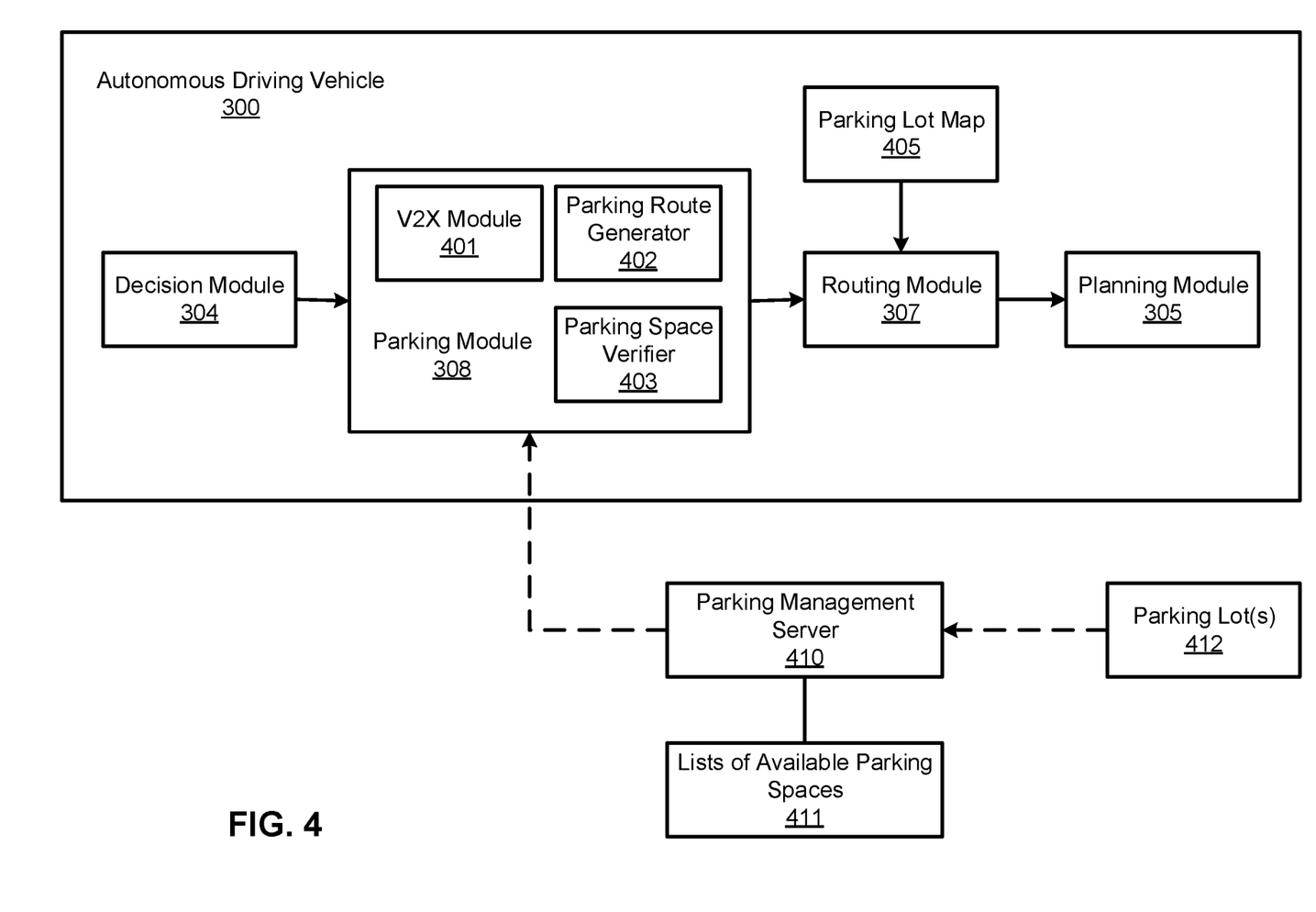
FIG. 4 is a processing diagram illustrating a process of autonomously parking a vehicle according to one embodiment.

In one embodiment, referring now to FIG. 4, parking module 308 is communicatively coupled to modules 301-307 and is responsible for identifying a parking space in a parking lot and parking the vehicle in the parking space using a set of parking rules or algorithms 313. Parking module 308 is also communicatively coupled to a parking management system, represented by parking management server 410, over a network to obtain parking availability information of a particular parking lot dynamically at the point in time. The parking management or system is configured to centrally manage the parking spaces (also referred to as parking spots or parking areas) of various parking lots 412 using high-definition (HD) maps. In such a configuration, each of the participating parking lots 412 managed by central system 410 is equipped with one or more sensors (e.g., infrared, ultrasonic, pressure sensors, etc., not shown) that are configured to sense and detect which of the parking spaces of the parking lot are available. The signals representing the available parking spaces may be periodically transmitted from parking lots 412 to centralized server 410 over a network. The centralized server 410 compiles a list of parking spaces 411 that appear to be available at the point in time, which may be maintained in a database and accessible via an API over a network. The centralized server may be communicatively coupled to multiple parking lots to manage the parking spaces thereof.

When ADV 300 decides to park in a particular parking lot, in this example, parking lot 412, a V2X interface module 401 of parking module 308 accesses the centralized server 410 over a network, such as, for example, via a vehicle-to-everything (V2X) link to obtain a list of parking spaces 411 within the parking lot 412 that appear to be available at the point in time. Based on the list of apparent available parking spaces, parking route generator 402 of parking module 308 generates or invoke routing module 307 to generate a route to navigate through the available parking spaces within the parking lot, for example, one by one sequentially. When the ADV 300 reaches an available parking space indicated in the list, parking space verifier 403 of parking module 308 may perform or invoke perception module 302 to perform a perception process to verify whether the parking space is indeed available based on sensor data obtained from one or more sensors mounted on the vehicle. If so, planning module 305 plans a parking path to park the ADV into the parking space using a set of one or more parking rules. Note that modules 401-403 may be integrated as fewer modules as part of parking module 308.

Figure 5:
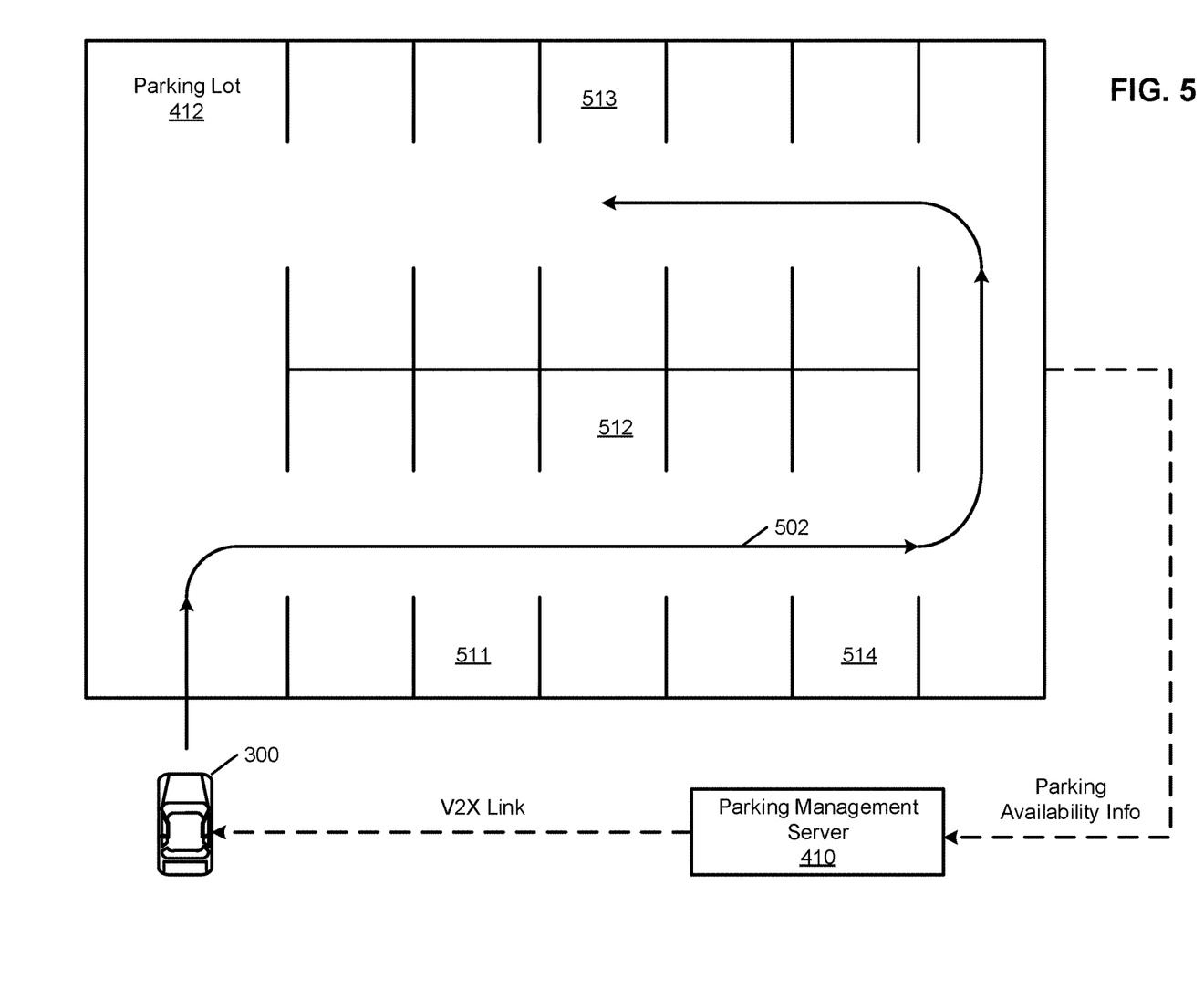
FIG. 5 is a block diagram illustrating a process of autonomously parking a vehicle according to one embodiment.

According to one embodiment, referring now to FIG. 4 and FIG. 5 as an example, in response to a request to park ADV 300 into parking lot 412, V2X interface module 401 of parking module 308 of ADV 300 accesses remote server 410 over a network (e.g., via VX2 link 501) to obtain a list of parking spaces 411 that appear to be available in the parking lot 412. Based on the list of available parking spaces 412 and the map associated with the parking lot 412, parking route generator 402 generates or invokes routing module 307 to generate a route 502 to navigate through at least the available parking spaces indicated in the list 411.

In this example, for the purpose of illustration, parking spaces 511-513 appear to be available as indicated in the list 411. Thus, route 502 will be designed to navigate through at least the apparently available parking spaces 511-513. The ADV 300 then drives according to the route 502 to locate at least one of the available parking spaces and to park the ADV into the located available parking space. Note that centralized server 410 is configured to periodically receive signals from a number of parking lots indicating which of the parking spaces of the parking lots are apparently available.

In one embodiment, the route 502 may be designed to navigate through all of the apparently available parking spaces 511-513 in the shortest distance. When an apparently available parking space is located, parking space verifier 403 of parking module 308 verifies or invokes perception module 302 to verify whether the parking space is indeed available based on the perception process. The verification process is performed based on sensor data obtained from various sensors mounted on the vehicle (e.g., LIDAR, camera, RADAR, etc.) If the parking space is unavailable in response to the verification, the ADV 300 continues to drive according to the route to locate a next parking space indicated in the list, until a parking space is located and verified or all of the parking spaces in the list have been processed.

For example, the list of available parking spaces 411 indicates that parking space 511 appears to be available. However, when ADV 300 reaches parking space 511, the parking space 511 may just be occupied by another vehicle. In this situation, ADV 300 will continue to drive according to route 502 to locate a next apparently available parking space, in this example, parking space 512, and so on. Note that a parking space apparently available when a sensor detects and sends a signal indicating the availability to the centralized server 410 may no longer be available by the time the vehicle reaches the parking space, as another vehicle may have been parked therein.

According to another embodiment, if there is no available parking spaces indicated in the list 411 or the list 411 cannot be obtained from the centralized server 410 due to network issues, ADV 300 may generate route 502 to drive through all of the parking spaces in the parking lot to locate a possible available parking space using a perception process based on sensor data obtained from the sensors of the ADV 300. In this example as shown in FIG. 5, although parking space 514 is not listed in the list 411 or list 411 cannot be obtained, ADV 300 may drive according to route 502 to locate and identify parking space 514 using a perception process. Without the list 411, ADV 300 may take longer time to locate and identify an available parking space. However when the list 411 is not available, such a method can serve as a backup option. Alternatively, both a method relied on perception and a method using centralized server method may be utilized in parallel to find a first parking space available in the parking lot.

Note that parking route 502 is generated based on a map associated with parking lot 412, also referred to as a parking lot map. Such a parking lot map is an HD map containing detailed information indicating the locations and/or layouts of the parking spaces within parking lot 412. The parking lot maps of different parking lots may have been previously loaded and stored in ADV 300, for example, as a part of map and route information 311 of FIG. 3A. Alternatively, a map of a particular parking lot may be obtained dynamically from server 410 when the vehicle is approaching the corresponding parking lot. When a parking lot has multiple parking levels, the map may include multiple sections, each section corresponding to one of the parking levels. The perception module 302 of ADV 300 can determine which of the parking levels the ADV 300 is currently located and load the proper map section for the current parking level.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
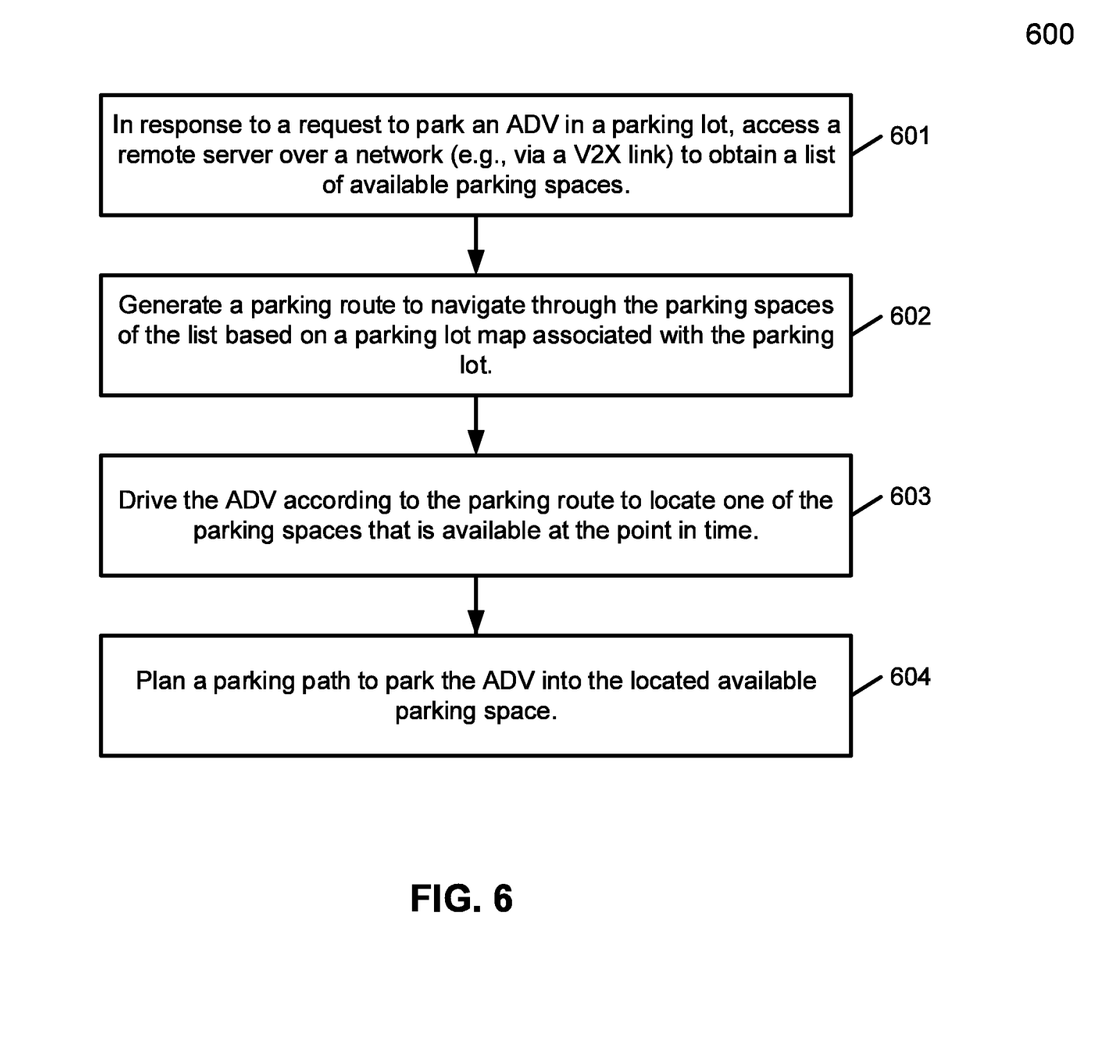
FIG. 6 is a flow diagram illustrating a process of autonomously parking a vehicle according to one embodiment.

FIG. 6 is a flow diagram illustrating a process of autonomously parking a vehicle according to one embodiment. Process 600 may be performed by processing logic which may include software, hardware, or a combination thereof. For example, process 600 may be performed by parking module 308. Referring to FIG. 6, in operation 601, in response to a request to park an ADV in a parking lot, processing logic accesses a remote server (e.g. a centralized parking management server) over a V2X link to obtain a list of parking spaces within the parking lot that appear to be available. In operation 602, processing logic generates a parking route to navigate through at least the apparently available parking spaces in the parking lot. In one embodiment, the route is designed to go through all of the apparently available parking spaces in the shortest route. In operation 603, the ADV drives according to the parking route to locate one of the available parking spaces in the parking lot. In response to locating an available parking space, in operation 604, processing logic plans a parking path to park the vehicle into the parking space.

Figure 7:
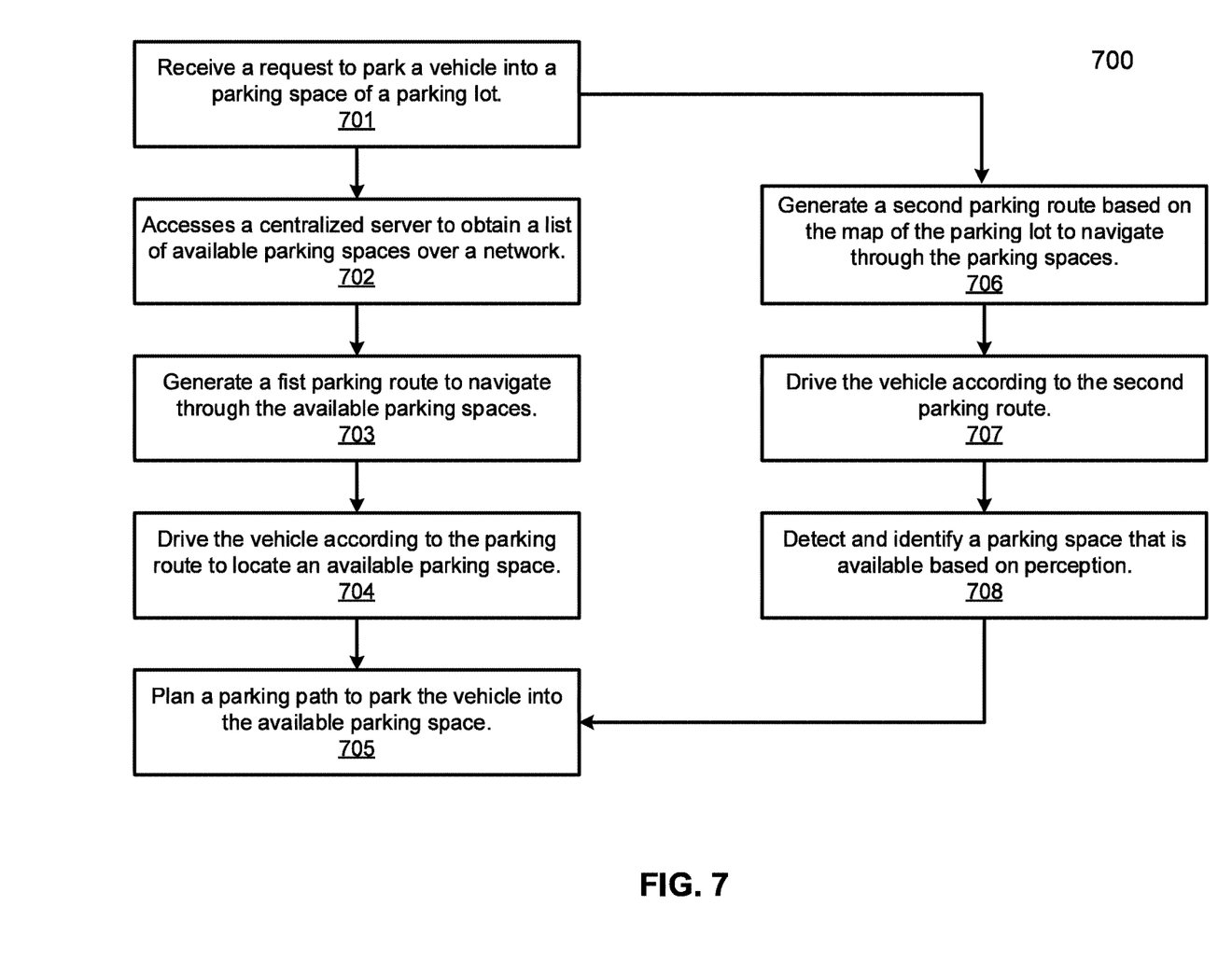
FIG. 7 is a flow diagram illustrating a process of autonomously parking a vehicle according to another embodiment.

FIG. 7 is a flow diagram illustrating a process of autonomously parking a vehicle according to another embodiment. Process 700 may be performed by processing logic which may include software, hardware, or a combination thereof. For example, process 700 may be performed by parking module 308. Referring to FIG. 7, in operation 701, processing logic receives a request to park the vehicle into a parking space of a parking lot. In response to the request in operation 702, processing logic accesses a centralized parking management system over a network to obtain a list of available parking spaces of the parking lot. In operation 703, processing logic generates a first parking route to navigate through at least the available parking spaces based on an HD map associated with the parking lot. In operation 704, the vehicle drives according to the first parking route to locate one of the available parking spaces. If the located parking space is verified, in operation 705, a parking path is planned to autonomously park the vehicle into the parking space.

On the other hand, in parallel or as alternatively, in response to the request to park the vehicle, in operation 706, processing logic generates a second parking route based on the map of the parking lot to navigate through at least a portion of the parking spaces of the parking lot. In operation 707, the vehicle drives according to the second parking route. In operation 708, processing logic identifies and detects an available parking space using a perception process based on sensor data obtained from one or more sensors of the vehicle. Note that the operations 702-704 and the operations 706-708 can be performed in parallel. Alternatively, operations 706-708 can be performed when the list of available parking spaces cannot be obtained or the operations 702-704 fail to locate an available parking space.

Figure 8:
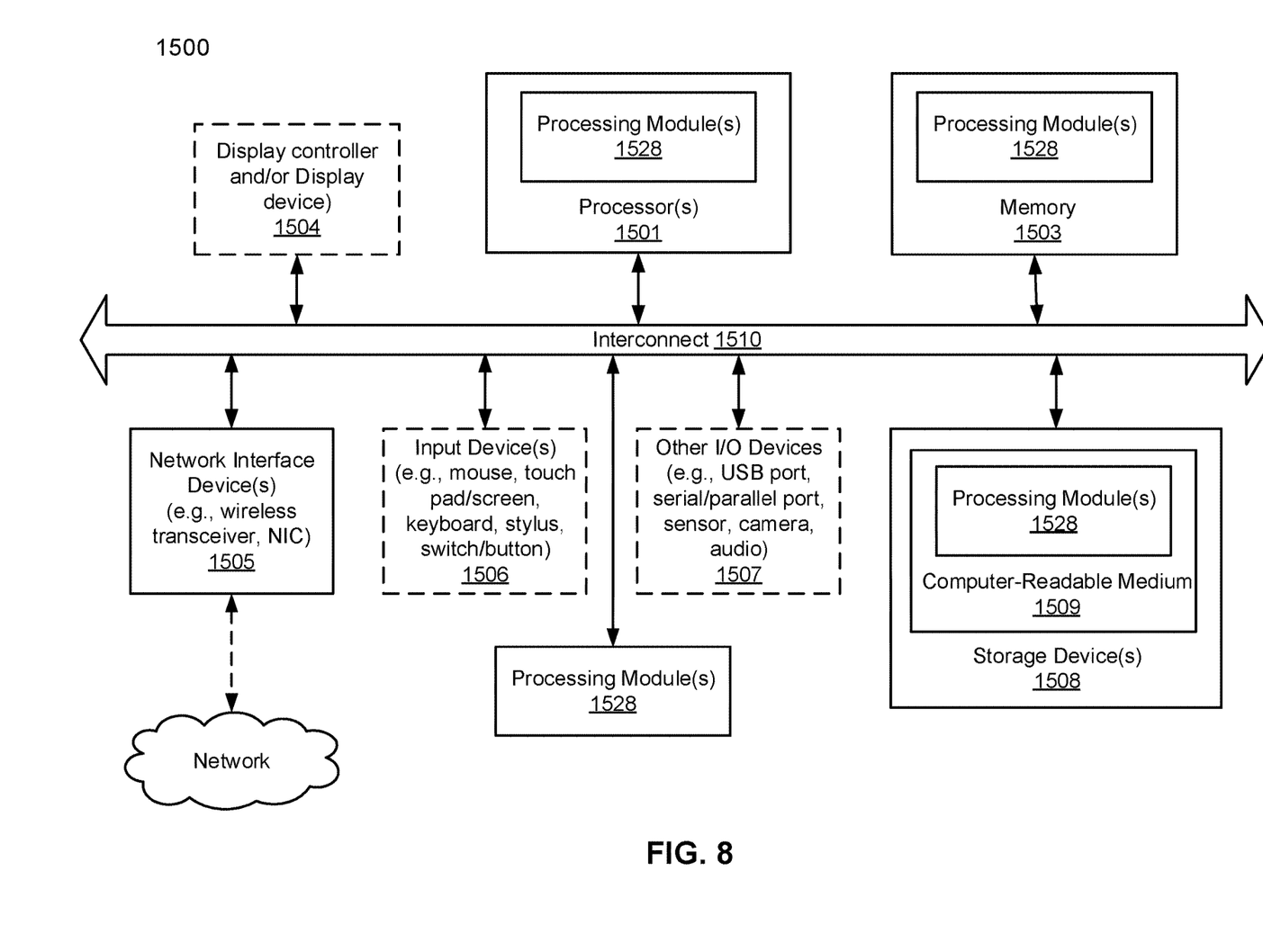
FIG. 8 is a block diagram illustrating a data processing system according to one embodiment.

FIG. 8 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS/iOS from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and/or parking module 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
   in response to a request to park an autonomous driving vehicle (ADV) in a parking lot, accessing a remote server over a vehicle-to-everything (V2X) link to obtain a list of one or more parking spaces that appear to be available in the parking lot;
   generating a route to navigate through the parking spaces of the list based on a parking lot map associated with the parking lot;
   driving the ADV according to the route to locate one of the parking spaces that is available at a point in time;
   in response to locating an available parking space, planning a parking path to park the ADV into the available parking space; and
   in response to locating a first parking space indicated in the list, determining whether the located first parking space is indeed available based on sensor data obtained from one or more sensors mounted on the ADV, wherein the parking path is planned to park the ADV into the first parking space if the first parking space is indeed available based on the sensor data.

2. The method of claim 1, wherein the remote server periodically receives signals from a plurality of sensors disposed within the parking lot, the signals indicating which parking space is available.

3. The method of claim 1, wherein generating a route to navigating through the parking spaces comprises generating a shortest route that goes through the parking spaces that appear to be available.

4. The method of claim 1, further comprising, in response to determining that the first parking space is unavailable based on the sensor data, continuing driving the ADV along the route to locate a next parking space indicated in the list.

5. The method of claim 4, wherein continuing driving the ADV along the route is performed until an available parking space is located or all parking spaces in the list have been processed.

6. The method of claim 1, wherein the one or more sensors comprise a LIDAR device.

7. The method of claim 1, wherein if the list does not contain any parking space apparently available from the remote server, the method further comprises:
   generating a second route to navigate through at least a portion of parking spaces of the parking lot based on the parking lot map;
   driving the ADV according to the second route; and
   identifying an available parking space based on sensor data obtained from one or more sensors of the ADV.

8. The method of claim 1, wherein if the remote serve is inaccessible, then the ADV drives by all of the parking spaces in the parking lot to locate the one of the parking spaces that is available.

9. A non-transitory machine-readable medium having instructions stored therein, which when executed by a processor, cause the processor to perform operations, the operations comprising:
   in response to a request to park an autonomous driving vehicle (ADV) in a parking lot, accessing a remote server over a vehicle-to-everything (V2X) link to obtain a list of one or more parking spaces that appear to be available in the parking lot;
   generating a route to navigate through the parking spaces of the list based on a parking lot map associated with the parking lot;
   driving the ADV according to the route to locate one of the parking spaces that is available at a point in time;
   in response to locating an available parking space, planning a parking path to park the ADV into the available parking space; and
   in response to locating a first parking space indicated in the list, determining whether the located first parking space is indeed available based on sensor data obtained from one or more sensors mounted on the ADV, wherein the parking path is planned to park the ADV into the first parking space if the first parking space is indeed available based on the sensor data.

10. The machine-readable medium of claim 9, wherein the remote server periodically receives signals from a plurality of sensors disposed within the parking lot, the signals indicating which parking space is available.

11. The machine-readable medium of claim 9, wherein generating a route to navigating through the parking spaces comprises generating a shortest route that goes through the parking spaces that appear to be available.

12. The machine-readable medium of claim 9, wherein the operations further comprise, in response to determining that the first parking space is unavailable based on the sensor data, continuing driving the ADV along the route to locate a next parking space indicated in the list.

13. The machine-readable medium of claim 12, wherein continuing driving the ADV along the route is performed until an available parking space is located or all parking spaces in the list have been processed.

14. The machine-readable medium of claim 9, wherein the one or more sensors comprise a LIDAR device.

15. The machine-readable medium of claim 9, wherein if the list does not contain any parking space apparently available from the remote server, the operations further comprise:
   generating a second route to navigate through at least a portion of parking spaces of the parking lot based on the parking lot map;
   driving the ADV according to the second route; and
   identifying an available parking space based on sensor data obtained from one or more sensors of the ADV.

16. The machine-readable medium of claim 9, wherein if the remote serve is inaccessible, then the ADV drives by all of the parking spaces in the parking lot to locate the one of the parking spaces that is available.

17. A data processing system, comprising:
- a processor; and
- a memory coupled to the processor to store instructions, which when executed by the processor, cause the processor to perform operations, the operations including
    - in response to a request to park an autonomous driving vehicle (ADV) in a parking lot, accessing a remote server over a vehicle-to-everything (V2X) link to obtain a list of one or more parking spaces that appear to be available in the parking lot,
    - generating a route to navigate through the parking spaces of the list based on a parking lot map associated with the parking lot,
    - driving the ADV according to the route to locate one of the parking spaces that is available at a point in time,
    - in response to locating an available parking space, planning a parking path to park the ADV into the available parking space, and
    - in response to locating a first parking space indicated in the list, determining whether the located first parking space is indeed available based on sensor data obtained from one or more sensors mounted on the ADV, wherein the parking path is planned to park the ADV into the first parking space if the first parking space is indeed available based on the sensor data.

18. The system of claim 17, wherein the remote server periodically receives signals from a plurality of sensors disposed within the parking lot, the signals indicating which parking space is available.

19. The system of claim 17, wherein generating a route to navigating through the parking spaces comprises generating a shortest route that goes through the parking spaces that appear to be available.

20. The system of claim 17, wherein if the remote serve is inaccessible, then the ADV drives by all of the parking spaces in the parking lot to locate the one of the parking spaces that is available.

* * * * *